No. 734,418. Patented July 21, 1903.

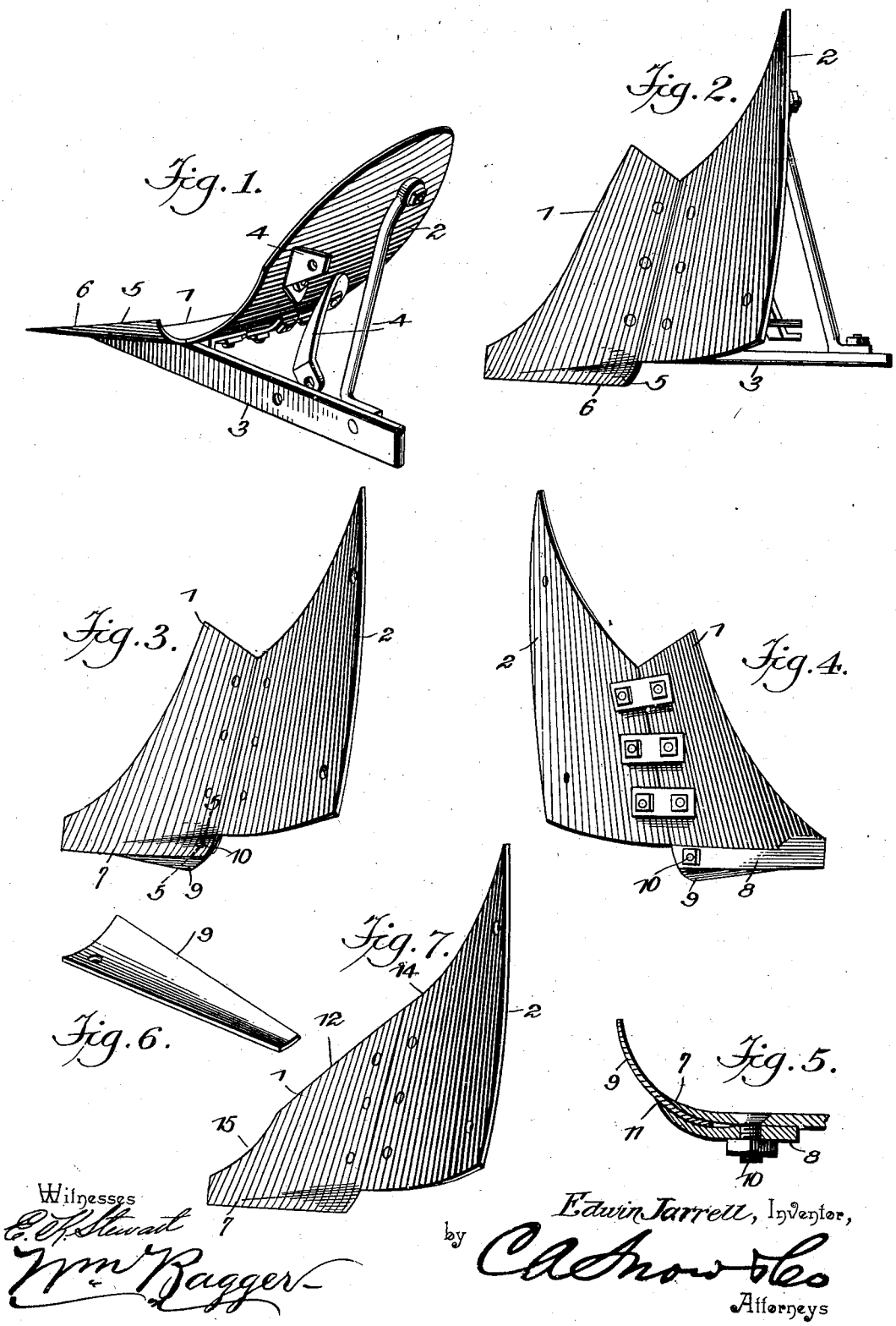

UNITED STATES PATENT OFFICE.

EDWIN JARRELL, OF RIVERDALE, KANSAS, ASSIGNOR OF ONE-HALF TO JOHN McARDLE, OF RIVERDALE, KANSAS.

PLOW.

SPECIFICATION forming part of Letters Patent No. 734,418, dated July 21, 1903.

Application filed March 30, 1903. Serial No. 150,254. (No model.)

*To all whom it may concern:*

Be it known that I, EDWIN JARRELL, a citizen of the United States, residing at Riverdale, in the county of Sumner and State of Kansas, have invented a new and useful Plow, of which the following is a specification.

This invention relates to plows, and it has for its object to provide a plow suitable for operation in divers kinds of land, whether it be soft and loamy or hard and dry soil.

Another object of my invention is to provide a plowshare adapted to engage the ground and to cut beyond the land, thereby greatly relieving the draft upon the plow caused by frictional engagement of the landside of the plow with the land-furrow.

A further object of my invention is to provide a plowshare with means for supporting a separate cutter of concavo-convex shape, which said cutter shall be adapted to extend beyond the land and to turn the slice loosened thereby in the direction of the moldboard, thereby turning a wide slice and tending to center the draft.

With these and other objects in view, all tending toward the production of a device of this class, which shall possess superior advantages in point of simplicity, durability, and general efficiency, my invention consists in the improved construction, arrangement, and combination of parts which will be hereinafter fully described, and particularly pointed out in the claims.

In the accompanying drawings, Figure 1 is a perspective view of a plow constructed in accordance with the principles of my invention. Fig. 2 is a top plan view of the same. Fig. 3 is a top plan view of a plow-blade, illustrating a modified construction. Fig. 4 is a bottom plan view of the same. Fig. 5 is a sectional detail view taken on the line 5 5 in Fig. 3. Fig. 6 is a perspective detail view of the cutter associated with the device illustrated in Figs. 3, 4, and 5. Fig. 7 is a plan view illustrating a modification.

Corresponding parts in the several figures are indicated by similar numerals of reference.

In the embodiment of my invention I employ a plowshare 1 and moldboard 2, which may be constructed either separately or integrally and which, as shown in Figs. 1 and 2, are supported upon a landside 3 and brackets 4, suitably extending from said landside. Additional brackets are to be provided for the attachment of the plow to suitable supporting means, which, however, have not been shown in the drawings.

In the general construction of the moldboard of the device no novelty is claimed; but the share is provided with a lateral extension 5, which is concavo-convex in cross-section and which is curved upwardly and outwardly in the direction of the land, the outer edge of said extension 5 being sharpened to form a cutting edge 6. In Figs. 1 and 2 of the drawings this extension and cutting edge have been shown as being formed integral with the share 1; but in Figs. 3, 4, 5, and 6 a modification is illustrated, which consists in providing the share with a lateral extension 7 in the direction of the land and securing upon the under side of said extension a reinforcing-plate 8, which is welded to or otherwise permanently connected with the under side of the point of the share. The rear end of said reinforcing-plate is not connected with the share, between which and said reinforcing-plate is, in this case, inserted a cutting-blade 9, which may be described as being approximately concavo-convex in cross-section, so that when inserted in position between the edge of the plowshare and the reinforcing-plate 8 the said cutting-blade shall be curved upwardly, so as to engage the land in precisely the same manner as the upwardly-curved projection 5 of the form of the device illustrated in Figs. 1 and 2. This cutter 9 is clamped detachably between the projecting edge of the plowshare and the reinforcing-plate 8 by means of a bolt 10 or other suitable means which will admit of the said cutter being detached when desired for the purpose of sharpening the same or of replacing it with a new one when necessary. It will be observed that the outer edge of the reinforcing-plate 8 is beveled to a sharp edge 11, which is flush with the under side of the cutter 9, so that when the parts are assembled for operation there shall be but slight frictional resistance to the progress of the device through the soil.

It will be observed that by the use of either device thus far described there will be a strong tendency toward the centering of the draft, owing to the lateral extension of the share in the direction of the land, the draft being obviously applied in the usual manner in the line of the landside of the plow. In order to increase this tendency to the centering of the draft, I may sometimes avail myself of the modified construction illustrated in Fig. 7, where it will be seen that the furrow end of the share is removed, so that the furrow edge 12 of the share shall be in longitudinal alinement with the furrow edge 14 of the moldboard. When this construction of the share is employed, it is evident that not only is draft upon the plow greatly relieved, but at the same time the furrow will be cut slantingly, such as it would be cut by means of a rotary disk, with this exception, however, that the bottom of the furrow will be cut flat by that portion 15 of the edge of the share which is disposed between the trimmed edge 11 and the point. This feature is considered of considerable importance, inasmuch as a much superior surface is provided for the draft-animals to travel upon than when rotary disks are used, while the advantages resulting from the use of rotary disks, mainly consisting in so turning the soil as to bury the hard and dry crusts and leave the soft pulverized portion of the soil exposed, leaving the ground in a superior condition for subsequent cultivation, are retained.

It is obvious that several of the forms of my invention (illustrated in the drawings and hereinbefore described) may be attached to ordinary beams and standards and employed as walking-plows or that they may be connected with suitably-constructed sulky-frames as riding-plows. It is also obvious that a plurality of my improved plows may be used in connection with each other to form a gang composed of any desired number of units. I desire it, furthermore, to be understood that my improved plow is well adapted to be successfully used in connection with rotary colters, which are at the present time frequently and successfully used in connection with plows of various constructions.

I have in the foregoing described certain preferred forms of construction of my improved plow; but I desire it to be understood that I do not limit myself with regard to structural details or to the size, form, and relative proportions of the members of the device, but reserve to myself the right to any changes, alterations, and modifications which may be resorted to within the scope of my invention without departing from the spirit or sacrificing the utility of the same.

Having thus described my invention, I claim—

1. In a plow, a share having an extension forming a cutter curved upwardly and outwardly in the direction of the land, with its concave side uppermost.

2. In a plow, a share having an extension projecting laterally in the direction of the land, a reinforcing-plate upon the under side of said extension, and a cutter clamped between the latter and the reinforcing-plate, said cutter being curved upwardly and outwardly in the direction of the land, forming a longitudinal concavity in its upper side.

3. In a plow, a share having an extension projecting laterally in the direction of the land, a reinforcing-plate connected permanently with the under side of the point of said extension, a cutter clamped between said extension and the reinforcing-plate, and a connecting-bolt.

4. In a plow, a share having a lateral extension projecting in the direction of the land, a reinforcing-plate permanently secured to the under side of the point of said extension and having a beveled outer edge, a cutter fitted between the extension of the share and the reinforcing-plate, said cutter having an upwardly and outwardly curved cutting edge, and suitable clamping and connecting means.

In testimony that I claim the foregoing as my own I have hereto affixed my signature in the presence of two witnesses.

EDWIN JARRELL.

Witnesses:
  O. H. BENTLEY,
  HOMER WELLS.